United States Patent
Bennett

(10) Patent No.: US 8,812,805 B2
(45) Date of Patent: Aug. 19, 2014

(54) MIXED TECHNOLOGY STORAGE DEVICE THAT SUPPORTS A PLURALITY OF STORAGE TECHNOLOGIES

(75) Inventor: James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 1322 days.

(21) Appl. No.: 12/327,034

(22) Filed: Dec. 3, 2008

(65) Prior Publication Data
US 2010/0037002 A1 Feb. 11, 2010

Related U.S. Application Data

(60) Provisional application No. 61/086,389, filed on Aug. 5, 2008.

(51) Int. Cl.
*G06F 12/02* (2006.01)
*G06F 3/06* (2006.01)

(52) U.S. Cl.
CPC ............ *G06F 3/0661* (2013.01); *G06F 3/0604* (2013.01); *G06F 2212/217* (2013.01); *G06F 3/061* (2013.01); *G06F 3/0646* (2013.01); *G06F 3/0647* (2013.01); *G06F 2212/205* (2013.01); *G06F 3/0607* (2013.01); *G06F 3/0649* (2013.01); *G06F 3/065* (2013.01); *G06F 3/0664* (2013.01); *G06F 3/068* (2013.01); *G06F 3/0685* (2013.01)
USPC ........... 711/165; 711/103; 711/154; 711/162; 711/170; 711/173; 710/302

(58) Field of Classification Search
USPC .................. 711/103, 154, 162, 165, 170, 173
See application file for complete search history.

(56) References Cited

U.S. PATENT DOCUMENTS

| | | | | |
|---|---|---|---|---|
| 5,860,083 A * | 1/1999 | Sukegawa | ...................... | 711/103 |
| 7,853,759 B2 * | 12/2010 | Sadovsky et al. | ............. | 711/154 |
| 2002/0069317 A1* | 6/2002 | Chow et al. | ................... | 711/104 |
| 2002/0083264 A1* | 6/2002 | Coulson | ........................ | 711/112 |
| 2005/0172074 A1* | 8/2005 | Sinclair | ........................ | 711/114 |
| 2005/0251617 A1* | 11/2005 | Sinclair et al. | ................ | 711/103 |
| 2007/0226756 A1* | 9/2007 | Kubo et al. | ................... | 719/325 |
| 2008/0086600 A1* | 4/2008 | Qiao | ............................ | 711/133 |
| 2008/0140918 A1* | 6/2008 | Sutardja | ....................... | 711/103 |
| 2009/0106481 A1* | 4/2009 | Yang et al. | .................... | 711/103 |
| 2009/0300269 A1* | 12/2009 | Radke et al. | .................. | 711/103 |
| 2011/0010514 A1* | 1/2011 | Benhase et al. | ............... | 711/162 |

OTHER PUBLICATIONS

Thomas Gleixner, "NAND FLASH", Mar. 12, 2005, v 1.1. Retrieved from <http://www.linux-mtd.infradead.org/archive/tech/nand.html> on Sep. 9, 2013.*

* cited by examiner

*Primary Examiner* — Arpan P. Savla
(74) *Attorney, Agent, or Firm* — Garlick & Markison; Jessica W. Smith

(57) ABSTRACT

A mixed storage device includes a set of storage units, each potentially based on a different storage technology, such as NAND flash drive, NOR flash drive, magnetic hard drive, magneto-optical drives, optical drives, etc. The mixed storage device comprises a host bus connector that is used to connect to a peripheral bus that facilitates communication to a processor of a device (such as a PC) and a controller. The controller manages a NAND flash storage device, a NOR flash storage device, an optical storage device, a hard drive and other storage components plugged into or integrated with the mixed storage device.

20 Claims, 6 Drawing Sheets

MIXED TECHNOLOGY STORAGE DEVICE THAT SUPPORTS A PLURALITY OF STORAGE TECHNOLOGIES

CROSS REFERENCES TO RELATED APPLICATIONS

The present application claims priority under 35 U.S.C. 119(e) to U.S. Provisional Application Ser. No. 61/086,389, filed Aug. 5, 2008, and having a common title with the present application, which is incorporated herein by reference in its entirety for all purposes.

BACKGROUND

1. Technical Field

The present invention relates generally to digital storage; and, more particularly, to digital storage that is accessible by a digital device.

2. Related Art

In recent years, several different storage technologies have emerged, such as NAND based technology, NOR based technologies, SDRAM etc. Some of these types of storage are good for some types of data/content, and have their own drawbacks when employed for other types of data/content. Some technologies that are good for sequential data are not good for randomly accessed data. When data is stored in electronic devices or PCs, they are stored with an expectation of how they will be subsequently accessed. However, such expectations are often unrealistic, and access patterns change over time. Data access following new access patterns end up becoming slow and inefficient, as the storage device is often incapable of efficiently providing access for the new access patterns. This could be due to inherent drawbacks in the corresponding storage device or in the way they are managed.

Most Personal Computers (PCs) have a magnetic hard disk drive. Adding new types of storage is often impossible as the PCs do not support other protocols or adaptors, etc. Thus, users are coerced into buying a new PC when they need additional storage, even if the PCs have sufficient space for accommodating additional storage. Such storage technology obsolescence is a big problem for PC owners.

There are several different types of FLASH memory available in the market. Electronic devices often use one of them for storage. Phase-change memory (also known as PCM, PRAM, PCRAM, Ovonic Unified Memory and Chalcogenide RAM C-RAM) is a type of non-volatile computer memory that is popular in some types of devices. Different flash technologies employ different material, and have different properties. PRAM uses the unique behavior of chalcogenide glass, which can be "switched" between two states, crystalline and amorphous, with the application of heat. It is a new type of technology that is trying to replace Flash technologies, such as NOR and NAND flash, that has become the dominant technology wherever a significant amount of non-volatile, solid-state storage is needed.

These and other limitations and deficiencies associated with the related art may be more fully appreciated by those skilled in the art after comparing such related art with various aspects of the present invention as set forth herein with reference to the figures.

BRIEF SUMMARY OF THE INVENTION

The present invention is directed to apparatus and methods of operation that are further described in the following Brief Description of the Drawings, the Detailed Description, and the claims. Other features and advantages of the present invention will become apparent from the following detailed description of the invention made with reference to the accompanying drawings.

DETAILED DESCRIPTION

Figure 1:
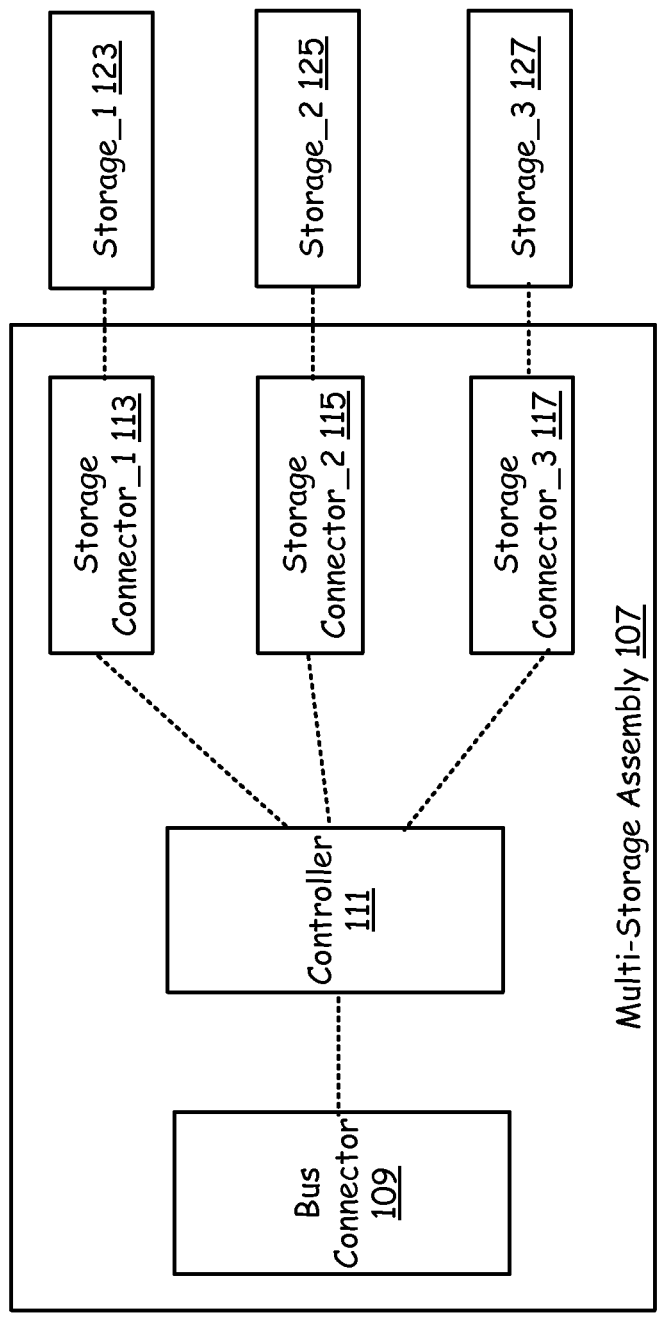
FIG. 1 is a schematic block diagram illustrating an assembly that is used to make a mixed technology storage device that combines a disparate set of storage devices into a single storage unit constructed according to one or more embodiments of the present invention.

FIG. 1 is a schematic block diagram illustrating an assembly that is used to make a mixed technology storage device that combines a disparate set of storage devices into a single storage unit constructed acc to one or more embodiments of the present invention. The multi-storage assembly 107 is used to make a mixed technology storage device by operationally combining disparate storage devices, each possibly based on a different storage technology, into a single storage unit. The multi-storage assembly 107 includes a bus connector 109, a controller 111, and a set of storage connectors 113, 115, 117 that each support one or more storage devices 123, 125, 127 that are external to the assembly. The bus connector 109 is adapted to plug into a host adapter on a motherboard and make it possible to interact with a processor on the motherboard as a peripheral device. The storage devices 123, 125, 127 can each be based on differing types of storage technologies such as magnetic memory, optical memory, NAND (Not-AND) based flash technology memory, NOR (Not-OR) based flash technology memory, SDRAM (Synchronous Dynamic Random Access Memory) based flash technologies, magneto-optical storage technologies, FRAM (Ferroelectric Random-Access Memory), MRAM (Magnetic Access Memory), STT-RAM (Spin Torque Transfer-Random Access Memory), PCM (Phase Change Memory), Charge Trap Flash memory, Nanocrystal memory, and FinFET (Fin-Shaped Field Effect Transistor) memory. For example, storage_1 113 can be a NAND based storage device (such as a NAND flash card or memory stick), storage_2 125 can be a NOR based storage device, and storage_3 127 can be a hard drive that would typically be plugged into a peripheral bus of a motherboard.

The controller 111 manages data reads/writes/erases of the storage devices plugged into and communicatively coupled to the controller 111 via the storage connectors 113, 115, 117. The controller 111 tracks content stored in those storage devices 123, 125, and 127 determines if the devices have to be moved or mirrored to make their access more efficient based on anticipated access modes and based on actual access patterns. The controller 111 also maintains a mapping of where different types of content must be placed when they are first saved, supports error detection and selectively enforces error correction, and displays some RAID functionality, such as mirroring and striping. The mirroring feature is conducted to enhance retrieval operations, for example based on determination of changes in access patterns. The controller also supports error reporting, caching to appropriate storage before executing in storage, such as caching to a NOR storage from NAND storage, in order to execute in place.

The controller 111 uses NOR flash memory storage (such as storages_1 123) to store relatively small amounts of executable code for embedded computing devices, such as PDAs and cell phones. NOR storage is well suited to use for code storage because of its reliability, fast read operations, and random access capabilities. For applications/code that needs to be executed, code can be directly executed in place in NOR based storage, the controller 111 employs NOR based storage for such applications/code. In one embodiment, to support execute-in-place applications the controller 111 employs NOR-based storage for storing firmware, boot code, operating systems, and other data that is altered infrequently but those that need to be accessed in a random fashion and executed in place.

As NAND flash memory has become the preferred format for storing larger quantities of data on devices such as USB Flash drives, digital cameras and MP3 players, the controller 111 manages large data sets that are often read in a sequential manner in NAND-based storage. The controller 111 determines that some content to be saved in consumer media applications is large files of sequential data. For this storage duty, the controller 111 selects NAND based storage to provide higher density, lower cost, and faster write and erase times, and a longer re-write life. Such large files of sequential data need to be loaded into memory quickly and replaced with new files repeatedly, and the controller 111 selects NAND based storage for that reason.

The controller 111 therefore is capable of determining location of applications/code, small sets of data, large data files, files that are always accessed sequentially, record sets that need to support random access, etc. The controller 111 is capable of making the choice between using NAND based storage, NOR Flash, hard drive, optical devices, etc., and is able to manage the tremendous need for storage with a demanding set of individual application performance requirements. The controller 111 is capable of providing an optimal layout that calls for multiple types of storage technologies in the same device/computer.

In one embodiment, the controller 111 and the storage devices 123, 125, 127 are combined and integrated into a single assembly. For example, storage_1 123 can be a NAND based flash card and storage_2 125 can be a NOR based flash card, both plugged into their respective storage connectors 113, 115 and integrated into the multi-storage assembly 107.

In another embodiment, portions of the controller 111 are integrated into the respective storage devices 123, 125, 127 and when the storage devices are plugged into their respective connectors 113, 115 and 117, they can interact with a processor via the bus connector 109. In a different embodiment, the controller 111 is external to the multi-storage assembly 107, and is plugged into the multi-storage assembly 107 by means of a controller connector (not shown). In another embodiment, the controller 111 is capable of interacting with device specific controllers provided as part of the storage devices 123, 125, 127 themselves.

Figure 2:
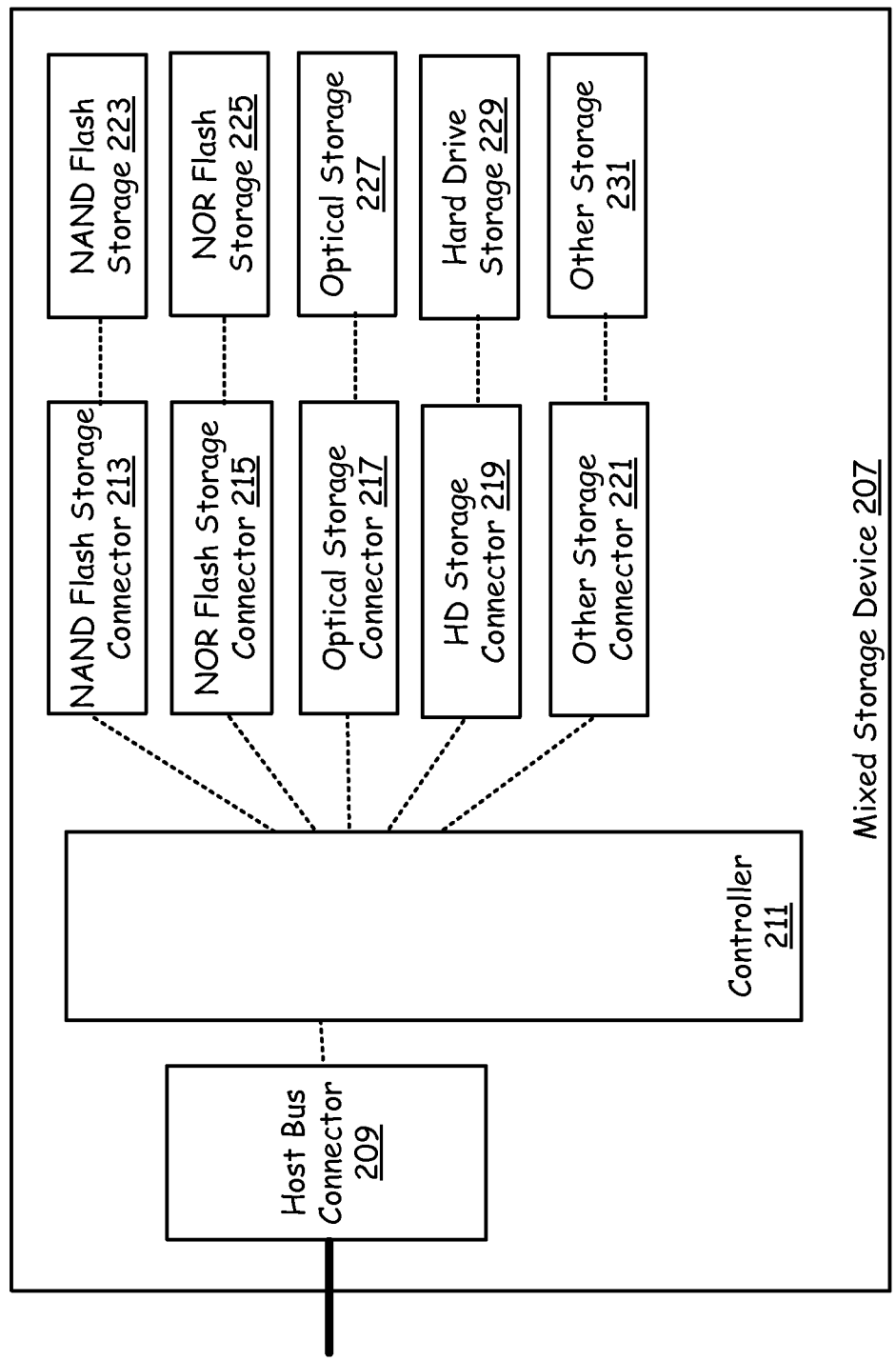
FIG. 2 is a block diagram illustrating a mixed storage device that includes a set of storage units based different storage technologies constructed according to one or more embodiments of the present invention.

FIG. 2 is a block diagram illustrating a mixed storage device that includes a set of storage units based different storage technologies constructed according to one or more embodiments of the present invention. The mixed storage device 207 includes a set of storage units each potentially based on a different storage technology, such as NAND flash drive, NOR flash drive, magnetic hard drive, magneto-optical drives, optical drives, etc. according to one or more embodiments of the present invention. The mixed storage device 207 includes a host bus connector 209 that is used to connect to a peripheral bus that facilitates communication to a processor of a device (such as a PC) and a controller 211. The mixed storage device 207 also includes a NAND flash storage connector 213, a NOR flash storage connector 215, an optical storage connector 217, a Hard Disk (HD) storage connector 219 and another storage connector 221. A NAND flash storage component 223 (such as a NAND flash drive or memory stick) is communicatively coupled to the NAND flash storage connector 213. A NOR flash storage component 225 (such as a NOR flash drive or memory stick) is communicatively coupled to the NOR flash storage connector 225. An optical storage component 227 (such as a CD-ROM drive) is communicatively coupled to the optical storage connector 217. A hard drive storage component 229 (such as a 1 terabyte magnetic hard drive) is communicatively coupled to the HD storage connector 219. Other types of storage devices 231 can be connected via appropriate other storage connectors 221.

The motherboard of a PC or of an electronic device in general has a host bus adapter that is used by the processor to talk to peripheral devices such as a hard disk storage 229 or flash storage 223, 225. The HD storage connector 219 of the hard disk 229 or of any peripheral device makes it possible for the peripheral device to communicate on the peripheral bus. Hard disk drives 229 are typically accessed over one of a number of standard bus types, including parallel ATA (PATA, also called IDE or EIDE), Serial ATA (SATA), SCSI, Serial Attached SCSI (SAS), and Fiber Channel.

The controller 211 determines the type of memory that needs to be used for particular types of data access modes—such as sequential mode data access, random mode data access, etc. It selectively moves data between storage types based upon the subsequent actual usage patterns for that data. It also turns off (powers off) the hard drive storage 229 except when needed for particular applications. It conducts data mirroring wherein it would use one type of memory for primary access of stored data and a different type, such as a slower storage, for redundant data. The controller 211 manages a memory map that it uses to track storage usage, storage limitations, appropriateness for particular data types, etc.

The controller 211 includes bridge circuitry that is sometimes used to connect hard disk drives to buses that they cannot communicate with natively, such as IEEE 1394 and USB. The controller 211 is capable of interacting and managing device specific controllers that may be integrated with the storage devices themselves. For example, some disk controllers are integrated into the hard disk drive storage 229. Specifically, disks called "SCSI disks" have built-in SCSI controllers. The controller 211 is capable of interacting with the inbuilt SCSI controllers provided with SCSI based hard drive storage 229.

The controller is able to interact with a host bus adapter of a PC or device it is used in via the host bus connector 209 that provides connectivity with a peripheral bus or a main bus of the PC or device. It employs common types of interfaces such as ATA (IDE) and Serial ATA. It can also interact with buses based on SCSI, Fiber Channel, or Serial Attached SCSI. In general, signals read by a storage device, such as by a disk read-and-write head of a hard drive storage 229, are converted by the controller 211, then transmitted over peripheral bus attached to the host bus connector 209, which is then converted again by a host adapter on a motherboard into the motherboard's bus suitable format and then read by CPU.

In one embodiment, the controller 211 mediates between a host adapter (such as those on a motherboard) and individual device specific controllers integrated into the storage units 223, 225, 227, 229, 231, such as and a disk controller integrated into the hard drive storage 229. It then allows a version of hardware RAID to be formed by the set of storage devices.

In another embodiment, the mixed storage device 207 the NAND flash storage connector 213 and NOR flash storage connector 215 are USB based connectors that connect to a NAND based USB memory stick 223 and a NOR based USB memory stick 225, respectively. In addition, the HD storage connector is an ATA based hard drive connector that connects to an ATA based magnetic hard drive storage 229. The controller 211 is able to move files and data between these devices 223, 225, 229 based on usage patterns and data types. The controller 211 uses the NOR based flash storage 225 to store data that needs to be read quickly, and don't need to be updated or written too often. This is appropriate for firmware and software applications. For data that need to be erased or written to quickly and frequently, it uses the NAND based flash storage 223. Since NAND is fast to erase and write, but slow to read non-sequential data the controller 211 avoids writing non-sequential data to the NAND based flash storage 223. As NAND is also prone to single-bit errors, requiring rigorous algorithms for error detection and correction, the controller 211 avoids correction in one embodiment and instead, accesses the same data from a mirrored location, wherein a complete set of the data is available.

In one embodiment, the mixed technology storage drive 207 is one wherein the set of storage technologies used in the storage components 223, 225, 227, 229, 231 includes magnetic drives, optical drives, NAND based flash technology, NOR based flash technology, SDRAM based flash technologies, magneto-optical storage technologies, FRAM, MRAM, STT-RAM, PCM, Charge Trap Flash, Nanocrystal and FinFET.

Figure 3:
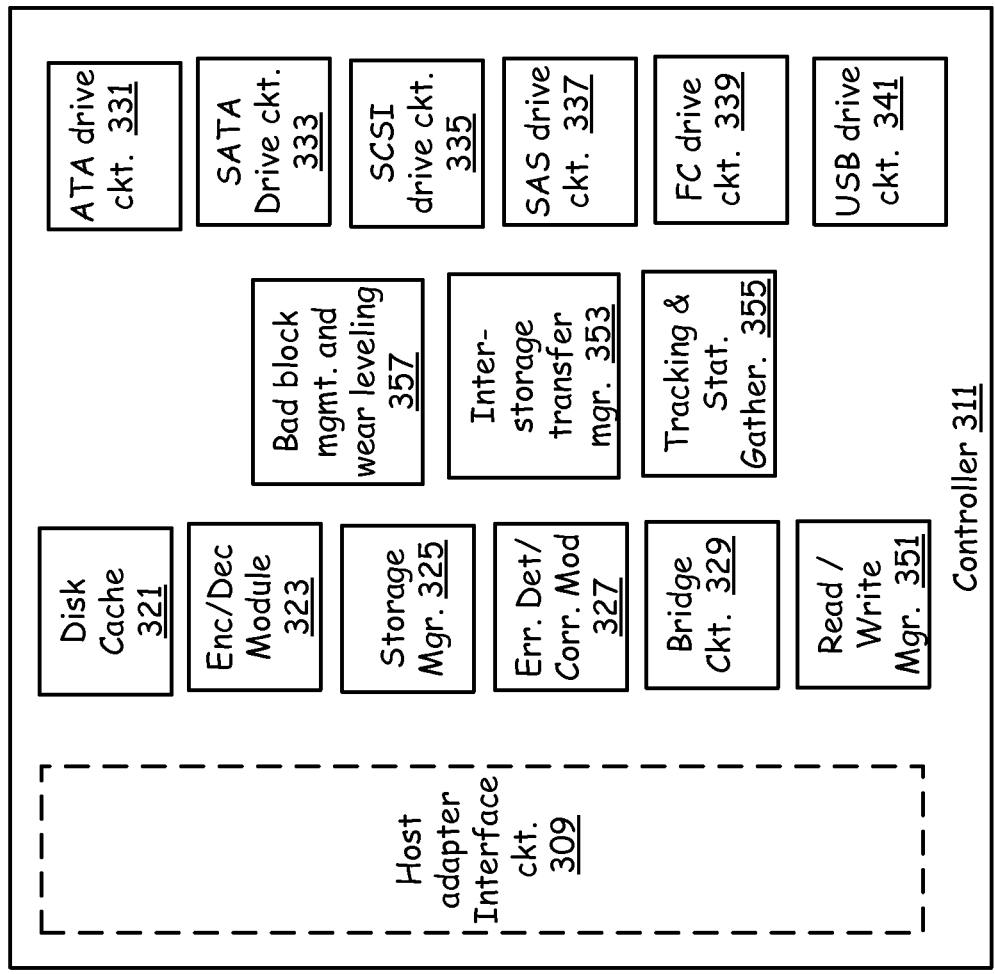
FIG. 3 is a block diagram illustrating a controller capable of managing a plurality of storage devices in a mixed storage device, each potentially employing a different storage technology constructed according to one or more embodiments of the present invention.

FIG. 3 is a block diagram illustrating a controller capable of managing a plurality of storage devices in a mixed storage device, each potentially employing a different storage technology constructed according to one or more embodiments of the present invention. The controller 311 manages a plurality of storage devices in a mixed storage device, each potentially employing a different storage technology according to one or more embodiments of the present invention. The controller 311 includes a set of storage drives circuitries, such as Advanced Technology Attachment (ATA) drive circuitry 331, Serial Advanced Technology Attachment (SATA) drive circuitry 333, an Integrated Drive Electronics (IDE) circuitry, Small Computer System Interface (SCSI) drive circuitry 335, Serial Attached SCSI (SAS) drive circuitry 337, Fiber Channel (FC) interface drive circuitry 339, and Universal Serial Bus (USB) drive circuitry 341. The controller 311 includes optional host adapter interface circuitry 309, disk cache 321, encoder/decoder module 323, storage manager 325, error detection and correction module 327, bridge circuitry 329, a read/write manager 351, a bad block management, wear leveling module 357, an inter-storage transfer manager 353, and a tracking and statistics gathering module 355.

The host adapter interface circuit 309 employs one of an ATA, SATA, SCSI and FC based protocols to interact with a host adapter that is part of a typical motherboard. In one embodiment, the host adapter interface circuit 309 supports all of these protocols to interact with a host adapter (available on a motherboard) to which it connects via a connector, such as the host bus connector 209. In one embodiment, the host adapter interface circuit 309 supports only one of the protocols ATA, SATA, SCSI, and FC.

The ATA drive circuitry 331 connects to and manages ATA drives that are plugged into (or part of) a mixed storage device 207. The SATA drive circuitry 333, the SCSI drive circuitry 335, and the SAS drive circuitry 337 are used to connect to and manage a SATA based hard drive, a SCSI based storage unit and a SAS based storage unit respectively. The FC drive circuitry 339 is used to manage external storage area networks (SAN), internal FC based hard disks, CDROMS, DVD units, etc. The USB drive circuitry 341 is used to connect to and manage USB based storage devices, such as NAND based flash storage, NOR based flash storage, etc.

The bad block management and wear leveling module 357 keeps track of bad blocks in the individual storage units being managed. It also keeps track of mean time between failures (MTBF) for the various storage units. If it determines that a device has developed a bad block and cannot provide a requested content without errors, it determines the location of its mirrored copy and retrieves that, and also marks the original as corrupt. It also determines that a storage unit is progressively developing bad blocks and becoming less useful and migrates the stored content to other storage units in the mixed storage device 207. It attempts to avoid overuse of some of the storage devices that could result in its premature wearing.

The error detection/correction module 327 monitors error occurrences during read/write operations and transfer operations. It selectively conducts correction when an error (such as a parity error) is encountered. It also selectively avoids correction when such errors occur, and instead of correction, resorts to finding an alternative storage where the same data/content is stored and currently available. The disk cache 321 facilitates caching of data that has been retrieved from one of the storages being managed by the controller 311 so that a subsequent request for the same data can be more efficiently managed. The inter-storage transfer manager 353 facilitates backup of data and mirroring of data, when it is necessary. For example, if the controller determines that a particular content is seldom accessed, it moves it to a slower storage—for example from a NAND flash, NOR flash or HD storage, to an optical storage device. Mirroring can be initiated for more reasons than for redundancy. For example, if the controller determines that particular content is being accessed in a usage pattern different than the anticipated pattern (based on, for example, the content type), the controller 311 causes the inter-storage transfer manager 353 to transfer the data to a different type of storage that employs a different storage technology and more effectively supports the new/actual pattern of usage of the content.

Figure 4:
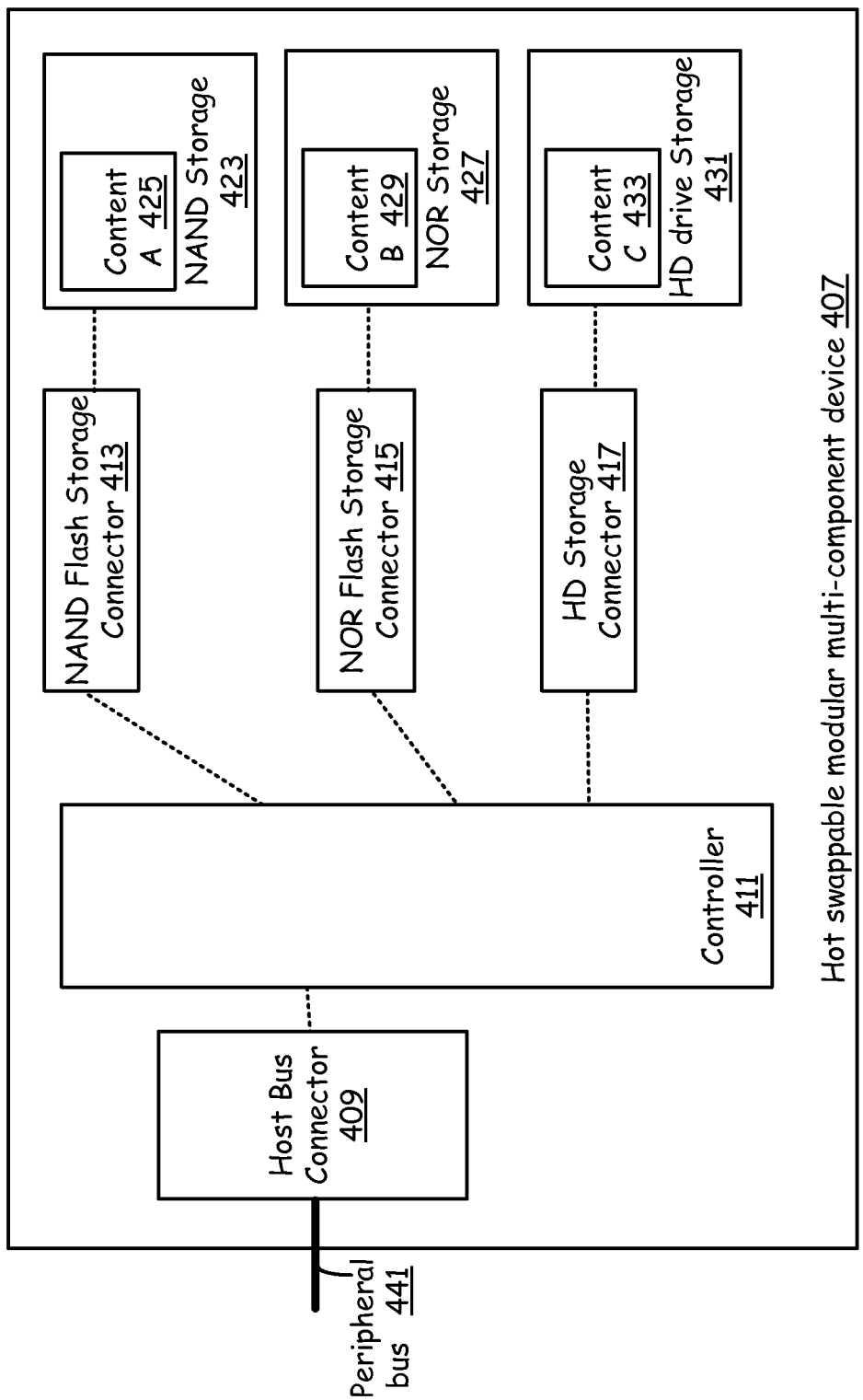
FIG. 4 is a block diagram illustrating a hot swappable modular multi-component storage device that includes a controller, NAND (Not-AND) storage, NOR (Not-OR) storage, and a hard disk drive constructed according to one or more embodiments of the present invention.

FIG. 4 is a block diagram illustrating a hot swappable modular multi-component storage device that includes a controller, NAND storage, NOR storage, and a hard disk drive constructed according to one or more embodiments of the present invention. The hot swappable modular multi-component storage device 407 includes a controller 411, NAND storage 423, NOR storage 427, and hard disk drive storage 431. Each of the NAND storage 423, NOR storage 427, and hard disk drive storage 431 are hot swappable and the controller 411 manages selective mirroring, storage based on content type, migration of stored content based on access patterns, etc. The storage units 423, 427, 431 communicatively couple to the controller 411 via appropriate connectors, such as NAND flash storage connector 413, NOR flash storage connector 415, and HD storage connector 417. The controller 411 communicates with an adapter on a motherboard or with a peripheral device port via the host bus connector 409 to which a peripheral bus 441 is connected.

The controller 411 stores content, such as content A 425 in NAND storage 423 based on the type associated with content A 425. For example, if the type is an image, and the content is an album full of images that are sequentially accessed typically and that may be stored as they are taken from a camera, the controller 411 assigns it to be stored in the NAND storage 423. Similarly, if the content is firmware or software that is altered infrequently and accessed in a random manner, the controller 411 assigns stored information to be stored as content B 429 in the NOR storage 427. The controller 411 assigns the HD drive storage 431 for content that is large. Thus for applications requiring a large amount of storage, the HD drive storage 431 is the location, such as for the content C 433.

The controller 411 is capable of disk mirroring. For example, it is capable, in one embodiment, of RAID 1 functionality, involving the replication of logical disk partitions or segments on one device onto separate physical hard storage devices in real time to ensure continuous availability. The mirrored data segments or files are a complete logical representation of separate data segment or file copies.

When a storage device 423, 427, or 431 or a portion of a device becomes corrupt or unusable, the controller 411 selectively attempts recovery. With mirroring conducted regularly, an alternate copy of the corrupted data is likely to exist, that can be used in response to requests. Depending on the storage technologies of actual storage devices used, data replication is performed synchronously, asynchronously, semi-synchronously, or point-in-time by the controller 411, so as to address recovery needs selectively. Replication conducted via microcode on the controller 411 or via management software employed. In one embodiment, mirroring conducted by the controller 411 is synchronous. Synchronous writing typically achieves a recovery point objective of zero lost data.

In one embodiment, the controller 411 conducts data striping, which is the segmentation of logically sequential data, such as a single file, so that segments can be assigned to multiple physical devices (such as in a RAID storage) in a round-robin fashion and thus written concurrently. This technique is employed by the controller 411 if the processor is capable of reading or writing data faster than a single storage device 423, 427, 431 can supply or accept it. While a portion of the data is retrieved from the first storage device such as NAND storage 423, the second storage device, such as NOR storage 427 locates the next segment to be retrieved and transferred.

Mean time between failures (MTBF) is tracked by controller 411 and that information is used to determine if a frequently accessed content type needs to be located in a specific storage device. In one embodiment, the controller implements a modified version of RAID 1 wherein an exact copy (or mirror) of a set of data is created in a lazy fashion on two or more data storage device 423, 427, 431 based on access patterns anticipated and changes (that are tracked) to their access patterns.

Figure 5:
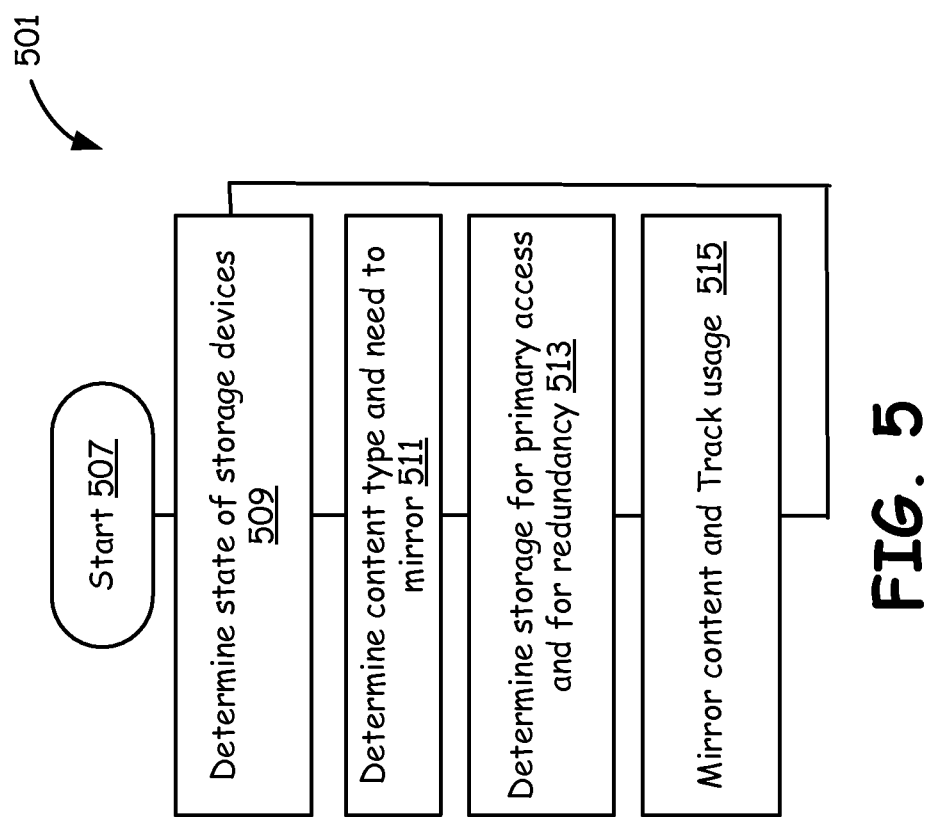
FIG. 5 is a flow chart illustrating operation of a controller for a mixed storage device according to one or more embodiments of the present invention.

FIG. 5 is a flow chart illustrating operation of a controller for a mixed storage device according to one or more embodiments of the present invention. Operation 501 starts at block 507 when the mixed storage device is powered up (such as when the electronic device or computer it is associated with is powered up). Then, at a next block 509, the states and availability of the storage devices is determined. The states of the storage devices used for storing different kinds of data/content is determined, and the applications that use them for specific purposes and specific data types are also determined. Then, at a next block 511, the controller determines the content type of data being accessed, the need to change their location based on usage patterns, and the need to mirror data that has not yet been mirrored. For example, the need to mirror content/data whose access patterns have significantly changed is determined.

Then, at a next block 513, the controller determines the storage for primary access of different types of data and the need for redundancy of the most frequently used data and content considered important. At a next block 515, the mirroring operations are conducted for all data/content that is determined to require mirroring, for redundancy or for supporting changes in access patterns, etc. In addition, the various data/content and usage by applications are racked. Then, processing continues at a next block 509.

Figure 6:
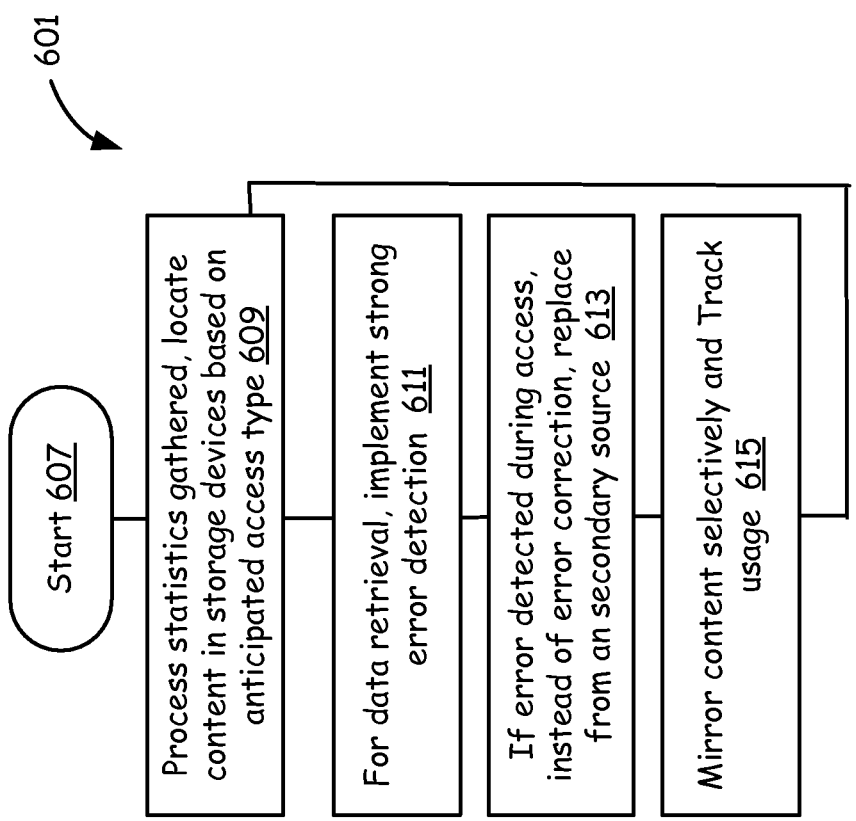
FIG. 6 is a flow chart of an exemplary operation of a controller for a mixed storage device according to one or more embodiments of the present invention.

FIG. 6 is a flow chart of an exemplary operation of a controller for a mixed storage device according to one or more embodiments of the present invention. Operation 601 of the controller starts at a block 607 when the controller is powered up and it is ready to manage the storage devices. At a next block 609, the controller processes statistics gathered, and locates content in storage devices based on anticipated access types/patterns. Then, at a next block 611, when a data retrieval operation is to be conducted, the controller implements strong error detection. The controller may not conduct error correction. Then, at a next block 613, if an error is detected during a retrieval of a stored content from a primary location for that content, then instead of resorting to error correction, the controller determines a secondary source or alternate location for that content and has it retrieved from that location. In one related embodiment, it provides for limited, if not, no error correction. For example, based on configuration, a limited error correction is selectively provided following error detection. Then, at a next block 615, content is mirrored selectively and its usage is tracked. For example, if content that was originally anticipated to be read-only is modified frequently, then its location is mirrored (copied for example) from NOR based storage device to NAND based storage device. Again, if portions of a content that is expected to be accessed in a sequential manner is accessed in a random fashion, then it is mirrored from a NAND based storage device to a NOR based storage device. Then, processing continues at a next block 609.

According to another operation of the present invention, the controller circuitry determines that content stored in a portion of the hot swappable modular multi-component storage device is never read or accessed and transfers the content to an optical storage that is part of the hot swappable modular multi-component storage device. When transferring content, the controller may encode the content using hamming codes or another type of coding.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip," as used herein, refers to an integrated circuit. Circuits and circuitry may comprise general or specific purpose hardware, or may comprise such hardware and associated software such as firmware or object code.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A mixed technology storage drive for storing and retrieving various types of content, the mixed technology drive comprising:
    a plurality of storage components, each supporting a different one of a set of storage technologies;
    a controller coupled to the plurality of storage components and operable to manage the plurality of storage components;
    the controller determining an appropriate one of the plurality of storage components for storing given content based upon an anticipated usage pattern of the given content, wherein the anticipated usage pattern includes one of: sequential mode data access and random mode data access;
    the controller monitoring the access characteristics of the given content to determine an actual usage pattern of the given content; and
    the controller selectively moving the given content from one of the plurality of storage components to another one of the plurality of storage components based upon the actual usage pattern of the given content, wherein the actual usage pattern of the given content includes a different one of: sequential mode data access and random mode data access.

2. The mixed technology storage drive of claim 1 wherein the set of storage technologies comprises at least two of magnetic drives, optical drives, NAND (Not-AND) based flash technology memory, NOR (Not-OR) based flash technology memory, SDRAM (Synchronous Dynamic Random Access Memory) based flash technologies, magneto-optical storage technologies, FRAM (Ferroelectric Random-Access Memory), MRAM (Magnetic Access Memory), STT-RAM (Spin Torque Transfer-Random Access Memory), PCM (Phase Change Memory), Charge Trap Flash memory, Nanocrystal memory, and FinFET (Fin-Shaped Field Effect Transistor) memory.

3. The mixed technology storage drive of claim 2 wherein some of the plurality of storage components is powered off except when needed for access by particular applications.

4. The mixed technology storage drive of claim 2 wherein the mixed technology storage drive facilitates automatic content mirroring employing one of the plurality of storage components associated with one of the set of storage technologies for primary storage and access and a different one of the a plurality of storage components associated with a different one of the set of storage technologies for backup.

5. The mixed technology storage drive of claim 2 wherein the controller manages a memory map that it uses to track limitations of the set of storage technologies, various types of content, encoding requirements for the various types of content, storage access usage patterns for the various types of content and content stored.

6. The mixed technology storage drive of claim 2 wherein the mixed technology storage drive further comprises:
    a storage assembly with industry standard ports for coupling to the plurality of storage components, wherein some of the plurality of storage components are fixed while others of the plurality of storage components are removable.

7. The mixed technology storage drive of claim 2 wherein the controller is distributed at least in part with at least a portion located in at least one of the plurality of storage components.

8. The mixed technology storage drive of claim 2 wherein at least one of the plurality of storage components is hot swappable.

9. The mixed technology storage drive of claim 2 wherein the controller gathers statistics on each of the plurality of storage components, the statistics comprising at least one or more of the following:
    bytes and blocks read, sequential blocks read, frequency of read and write operations and event times and dates when such read occur;
    bytes and blocks written, sequential blocks written, frequency of writes and event times and dates when such writes occur; and
    number and location of erasures.

10. An electronic device comprising:
a hot swappable modular multi-component storage device including a first storage device having a first storage technology and a second storage device having a second storage technology;
controller circuitry coupled to the hot swappable modular multi-component storage device, wherein the controller circuitry determines to store a first type of data content in the first storage device based on a first anticipated usage pattern of the first type of data content, wherein the first anticipated usage pattern of the first type of data content includes at least one of: sequential mode data access and random mode data access; and
the controller circuitry computing access characteristics of the first type of data content to determine an actual usage pattern and subsequently moving the first type of data content from one storage device to another storage device based upon the actual usage pattern, wherein the actual usage pattern of the first type of data content includes at least a different one of: sequential mode data access and random mode data access.

11. The electronic device of claim 10, wherein:
the controller circuitry facilitating the hot swapping of a first component of the hot swappable modular multi-component storage device with another component.

12. The electronic device of claim 10 further comprising:
a motherboard that hosts a processor, the motherboard including a port for an external bus for communicatively coupling a hard drive storage to the processor;
the controller circuitry coupled to the port of the motherboard; and
the controller circuitry supporting hard drive storage as a component of the hot swappable modular multi-component storage device.

13. The electronic device of claim 10, wherein:
the controller circuitry determines some content stored by the hot swappable modular multi-component storage device as not being updated or updated infrequently and moves the content to NOR (Not-OR) based storage that is part of the hot swappable modular multicomponent storage device; and
the controller circuitry determines other content stored by the hot swappable modular multi-component storage device as being modified or updated frequently and moves the other content to NAND (Not-AND) based storage that is part of the hot swappable modular multi-component storage device.

14. The electronic device of claim 10, wherein
the controller circuitry determines that content stored in a portion of the hot swappable modular multi-component storage device is typically accessed in a sequential mode and updated frequently, and moves the content to a NAND (Not-AND) based storage that is part of the hot swappable modular multi-component storage device; and
the controller circuitry determines that other content stored in another portion of the hot swappable modular multi-component storage device is accessed in a random mode and also modified or updated infrequently, and moves the other content to a NOR (Not-OR) based storage that is part of the hot swappable modular multi-component storage device.

15. The electronic device of claim 10, wherein:
the controller circuitry determines that content stored in a portion of the hot swappable modular multi-component storage device is never read or accessed and transfers the content to an optical storage that is part of the hot swappable modular multi-component storage device.

16. The electronic device of claim 15 wherein the transfer involves encoding the content using hamming codes.

17. A storage assembly for supporting storage devices, the assembly comprising:
a plurality of storage connectors, each of the plurality of storage connectors for coupling to one of a plurality of corresponding storage devices, wherein each of the plurality of storage devices is based on a different storage technology;
a controller capable of managing the plurality of corresponding storage devices coupled to the plurality of storage connectors;
a bus connector for plugging into and communicatively coupling to a host adaptor of an electronic device;
the controller storing different types of data content in corresponding storage devices plugged into the plurality of storage connectors based upon an anticipated usage pattern of the different types of data content, wherein the anticipated usage pattern of a first type of data content includes at least one of: sequential mode data access and random mode data access;
the controller monitoring the access characteristics of the different types of data content to determine an actual usage pattern of the different types of data content; and
the controller selectively moving the first type of data content from one of the plurality of storage devices to another one of the plurality of storage devices based upon the actual usage pattern of the first type of data content, wherein the actual usage pattern of the first type of data includes at least a different one of: sequential mode data access and random mode data access.

18. The storage assembly of claim 17 further comprising:
the plurality of storage connectors comprising:
a NAND (Not-AND) based storage connector for receiving a NAND based storage component;
a NOR (Not-OR) based storage connector for receiving a NOR based storage component;
a hard disk drive storage connector for receiving a hard disk drive; and
the controller selectively storing the content in the NAND based storage component, the NOR based storage component, or the hard drive based on the content type of the content; and
the controller selectively copying the content to a different one of the corresponding storage device when it determines that the assigned storage is inappropriate based on statistics gathered.

19. The storage assembly of claim 17 wherein the storage assembly couples to a hard disk drive adapter of a personal computer, with the existing hard drive plugged into one of the plurality of storage connectors in the storage assembly.

20. The storage assembly of claim 17, wherein the controller monitors the access characteristics of the different types of data content to determine the actual usage pattern of the different types of data content including at least one or more of the following: bytes and blocks read and modified, sequential blocks read, and frequency of read and write operations.

* * * * *